(12) United States Patent
Balasubramanian et al.

(10) Patent No.: US 11,025,634 B2
(45) Date of Patent: Jun. 1, 2021

(54) ENHANCEMENT OF PRIVACY/SECURITY OF IMAGES

(71) Applicant: INTERNATIONAL BUSINESS MACHINES CORPORATION, Armonk, NY (US)

(72) Inventors: Swaminathan Balasubramanian, Troy, MI (US); Radha M. De, Howrah (IN); Ashley D. Delport, Durban (ZA); Indrajit Poddar, Sewickley, PA (US); Cheranellore Vasudevan, Bastrop, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 303 days.

(21) Appl. No.: 15/230,784

(22) Filed: Aug. 8, 2016

(65) Prior Publication Data

US 2018/0041504 A1 Feb. 8, 2018

(51) Int. Cl.
*H04L 29/06* (2006.01)
(52) U.S. Cl.
CPC ................................. *H04L 63/102* (2013.01)
(58) Field of Classification Search
CPC .................. G06F 21/10; G06F 2221/0737
See application file for complete search history.

(56) References Cited

U.S. PATENT DOCUMENTS

| | | | |
|---|---|---|---|
| 8,761,392 B2 | 6/2014 | Chen et al. | |
| 8,996,682 B2 | 3/2015 | Stevenson et al. | |
| 2008/0155701 A1* | 6/2008 | Martinez | G06F 21/10 726/27 |
| 2008/0215509 A1* | 9/2008 | Charlton | G06F 21/604 706/11 |
| 2013/0132854 A1 | 5/2013 | Raleigh et al. | |
| 2014/0310264 A1* | 10/2014 | D'Ambrosio | G06F 17/30265 707/722 |
| 2014/0359786 A1* | 12/2014 | Lee | G06F 21/10 726/27 |
| 2016/0035392 A1 | 2/2016 | Taylor et al. | |
| 2016/0232375 A1* | 8/2016 | Loeb | G06F 21/6245 |

OTHER PUBLICATIONS

Ahern et al., "Over-Exposed? Privacy Patterns and Considerations in Online and Mobile Photo Sharing," CHI 2007 Proceedings—Photo Sharing, Apr. 28-May 3, 2007, San Jose, CA (10 pages).
Besmer et al., "Moving Beyond Untagging: Photo Privacy in a Tagged World," CHI 2010: Privacy, Apr. 10-15, 2010, Atlanta, GA (10 pages).
Escalada Jimenez et al., "Tag Detection for Preventing Unauthorized Face Image Processing," 4th International Conference on Integrated Information (IC-ININFO 2014), May 9-Aug. 9, 2014, Madrid, Spain (12 pages).

(Continued)

*Primary Examiner* — Christopher C Harris
(74) *Attorney, Agent, or Firm* — Griffiths & Seaton PLLC

(57) ABSTRACT

Embodiments for enhancing privacy and security of an image by a processor. Metadata associated with the image is configured with a usage designation, the usage designation having accompanying notification information for notifying an owner of the usage designation if a condition of the usage designation is met.

18 Claims, 7 Drawing Sheets

(56) References Cited

OTHER PUBLICATIONS

Kim et al., "Semantic representation for copyright metadata of user-generated content in folksonomies," Online Information Review 34.4, 2010 (16 pages).
Seneviratne et al., "Addressing Data Reuse Issues at the Protocol Level," IEEE International Symposium on Policies for Distributed Systems and Networks (Policy), 2011 (4 pages).

* cited by examiner

ENHANCEMENT OF PRIVACY/SECURITY OF IMAGES

BACKGROUND OF THE INVENTION

Field of the Invention

The present invention relates in general to computing systems, and more particularly to, various embodiments for enhancing the privacy and security of images using a computing processor.

Description of the Related Art

In today's society, consumers, businesspersons, educators, and others use various images (e.g., photographs and video) with increasing frequency in a variety of settings. With the proliferation of images has also come various ways to accommodate the increasing amount of digital information corresponding to the images. For example, many photographs are now stored in large databases within and between distributed computing components, where individuals can access the images on a number of devices (e.g., computers, handheld devices, phones, tablets, and the like). In addition to the images being more readily accessible, the images are also sharable between individuals, such as by allowing access or sharing through social media scenarios. There are about 1.8 billion photos, for example, being uploaded to social networks on a daily basis.

SUMMARY OF THE INVENTION

Various embodiments for enhancing privacy and security of an image by a processor, are provided. In one embodiment, by way of example only, a method for enhancing privacy and security of an image, again by a processor, is provided. Metadata associated with the image is configured with a usage designation, the usage designation having accompanying notification information for notifying an owner of the usage designation if a condition of the usage designation is met.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
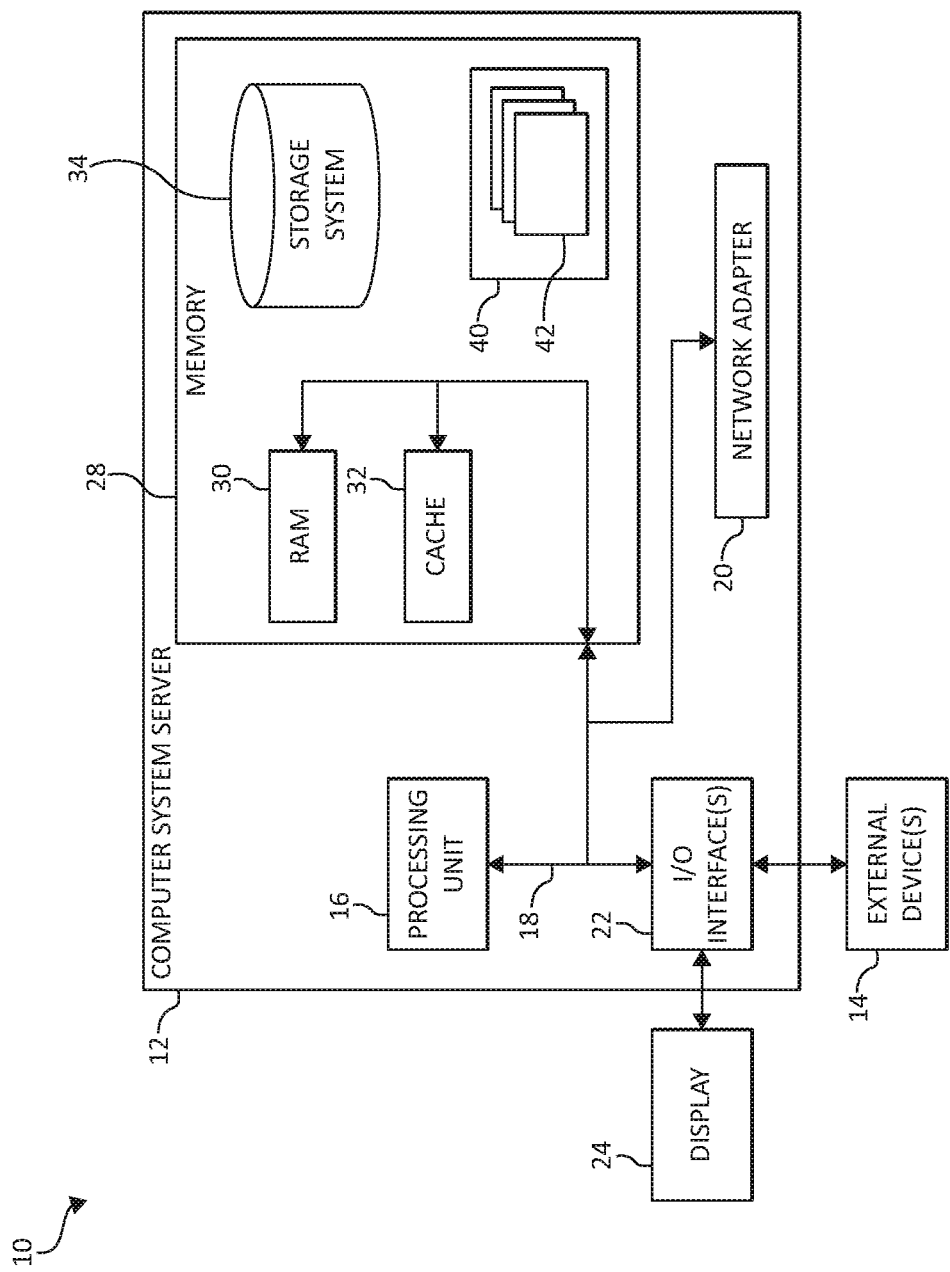
FIG. 1 is a block diagram depicting an exemplary cloud computing node according to an embodiment of the present invention.

As previously indicated, digital data representative of images (e.g., video or photos) is increasingly proliferating. Data is increasingly processed through a variety of geographically disbursed computing components, where, for example, a local node may contain a set of data processing components yet remain in remote communication with other portions of the distributed data processing system. To wit, a user's data may not be locally stored or processed on the user's local computer, but is instead hosted by one or more distributed storage components that are in remote communication with the local computer. This type of data storage may, in some cases, be referred to as "cloud," or "cloud-based" storage.

With the proliferation and management of photos and their associated digital information, has also come the proliferation of the sharing of photos across various networks, cloud-based systems, social media applications, and the Internet in general. As previously mentioned, there are about 1.8 billion photos being uploaded to social networks, for example, on a daily basis.

Currently however, there are no control/privacy restrictions over how the images uploaded to a remote destination from the user are ultimately used in the public domain. It should be possible for one to restrict images from being uploaded, and for a user to have an ability to control who has the authority to post (or re-post) these images on ownership, metadata, the content of the image, and how the image and/or associated metadata or other information can be utilized, shared, and the like.

Consider the following example. A popular social media organization uses facial recognition to auto-tag pictures. If an individual is tagged, that individual is only prompted to approve the image from being added to a time line or other social media structures. The individual, however, has no control of that image being posted elsewhere in the social network and how that image is used by others. In view of the foregoing, a need exists for mechanisms whereby an owner of various images, video or other information that carries privacy and/or security implications for the owner has more control over the dissemination of those images, video or other information.

The present invention provides various mechanisms of the illustrated embodiments that help to provide the owner with more control of images, video, or other information to enhance privacy and security. As a preliminary matter, it should be noted that reference to the terminology "image" herein is intended to refer to photographic images, video images, audio information (e.g., music), artwork or other illustrations, written information, or any information that may be shared across a network, such as a social media network, that may carry privacy and/or security implications for the owner of the work. Accordingly, use of the term "image" may be viewed in a broad sense to any fixed form of expression to which a user has ownership thereof.

In one embodiment, for example, these mechanisms add privacy and/or security information to metadata that is associated with the image. For example, the additional metadata may be appended to the image to denote various usage restrictions associated with the image, such as "do not copy," or "do not post," or "do not download," for example. The metadata may also include notification information that may be utilized by social networks, other applications, IT administrators, and others to notify the owner of the image that the image has been "found" in a particular place (e.g., their system).

In other embodiments, various other mechanisms such as similarity searching, facial recognition, using portions of an image, initiating web crawling or web patrolling operations to search for possible infringement of usage restrictions may also be implemented by aspects of the present invention. Again, once an infringement is determined, the metadata associated with the image may provide notification information to provide to the owner of the image (e.g., location, name, network address, email, username, or other identifying information). Other examples of various aspects of the illustrated embodiments, and corresponding benefits, will be described further herein.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
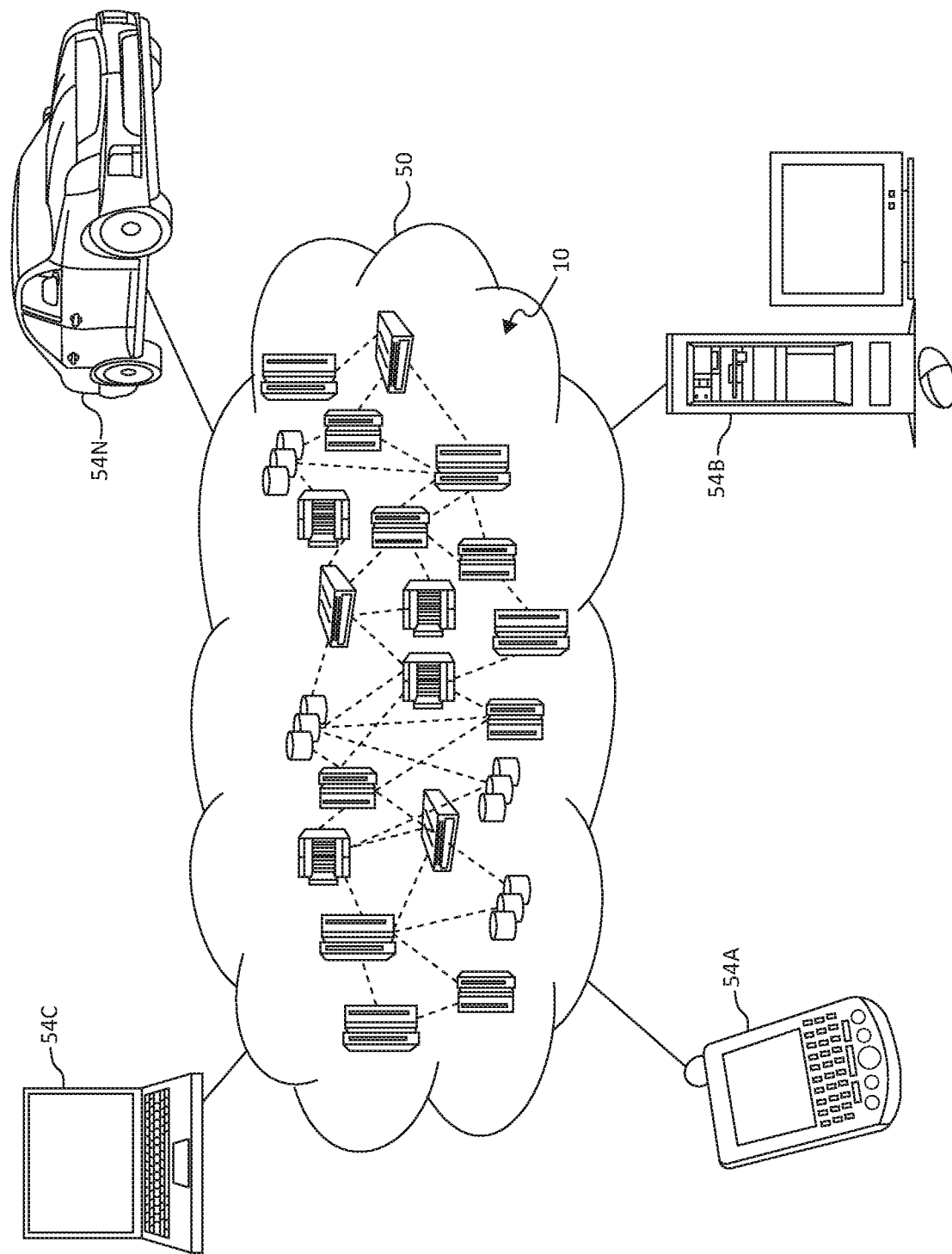
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
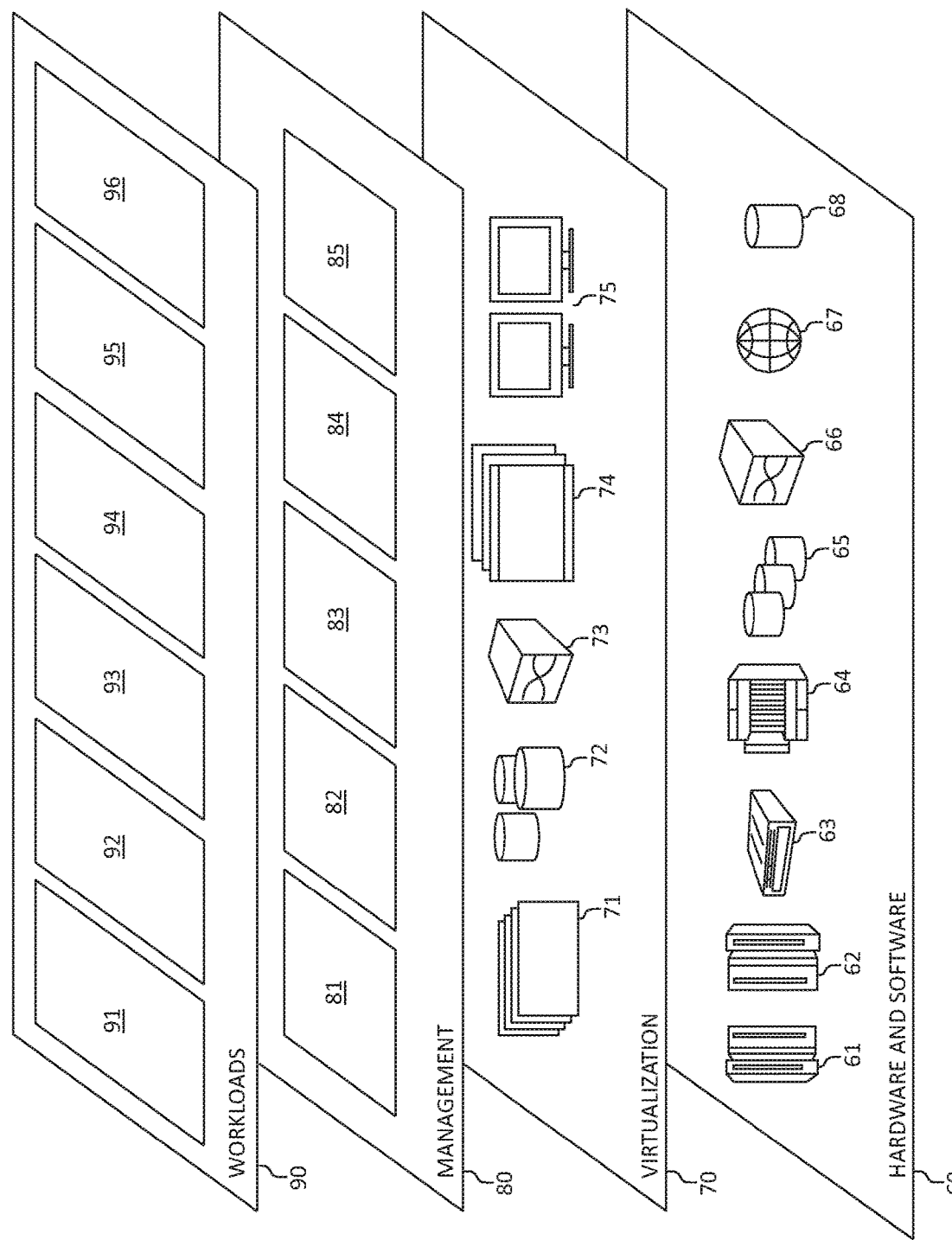
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various image processing workloads and functions 96. In addition, image processing workloads and functions 96 may include such operations as metadata analytics, metadata analysis, and as will be further described, security and/or privacy related searching and notification functionality. One of ordinary skill in the art will appreciate that the image processing workloads and functions 96 may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

As previously mentioned, the mechanisms of the illustrated embodiments provide novel approaches for the security and privacy enhancement of images that are in the public domain (video, photos, etc.) by, among other aspects, appending metadata to the image to denote ownership and usage restrictions on the image, taking steps to notify the owner if an infringement on any usage restriction is determined, and web crawling or otherwise searching for similar images.

It should be noted that while an owner of an image may refer to an individual who is in the image, or who generated or is otherwise responsible for the fixed expression, use of the term "owner" in the present disclosure and appended claims is intended to refer to any person or entity that originally placed the usage restriction/set the notification process in place. As will be further explained, one beneficial aspect of the mechanisms of the illustrated embodiments alleviates the necessity for an organization to verify "ownership." Rather, the usage restrictions and notification processes are put into place notwithstanding whether the individual placing the restrictions is an "owner" of the fixed expression in the traditional sense. Of course, an organization delivering the fixed expression may take validation steps to determine who placed the restrictions, but are not required to do so.

The mechanisms of the illustrated embodiments may be utilized by social networks, or any application in the public domain as a service when images are uploaded or hosted for their users. In one embodiment, upon an image upload, the mechanisms of the illustrated embodiments analyze the image and apply usage restrictions to the image based on the security and privacy settings for the image. The respective security and privacy profiles (inclusive of the usage restrictions) may be correlated based, in one embodiment, on the accompanying image metadata, context of the image, or content (such as a user's face).

As will be further described, some of the inventive aspects of the illustrated embodiments include, without limitation, the following. First, a mechanism for management of restrictions and privacy information as part of metadata of images (again, considering image in a broad sense), is provided. Second, a mechanism for setting specific rule(s) of restrictions as metadata appended to the image is provided. Third, a mechanism for validation of images during upload (e.g., when used as a service) is provided.

Fourth, a methodology for initialization of "patrolling" (e.g., web patrolling, or patrol of a specified network or storage location) functionality for owned images with accompanying usage restrictions for possible infringement is provided. Fifth, exemplary logic and methodologies to auto-crawl images available at private and public media sites, networks, storage locations, and other places, with accompanying functionality to validate the legitimacy of the published items, are provided. Finally, methodologies for detection and reporting to the image owner (e.g., security setting functionality) about any violation of security restrictions placed on the image, given the context of the published image (including such aspects as location of the image), and optionally, the prevention of the posting of each image determined to violate the specified security restriction, are provided.

Figure 4:
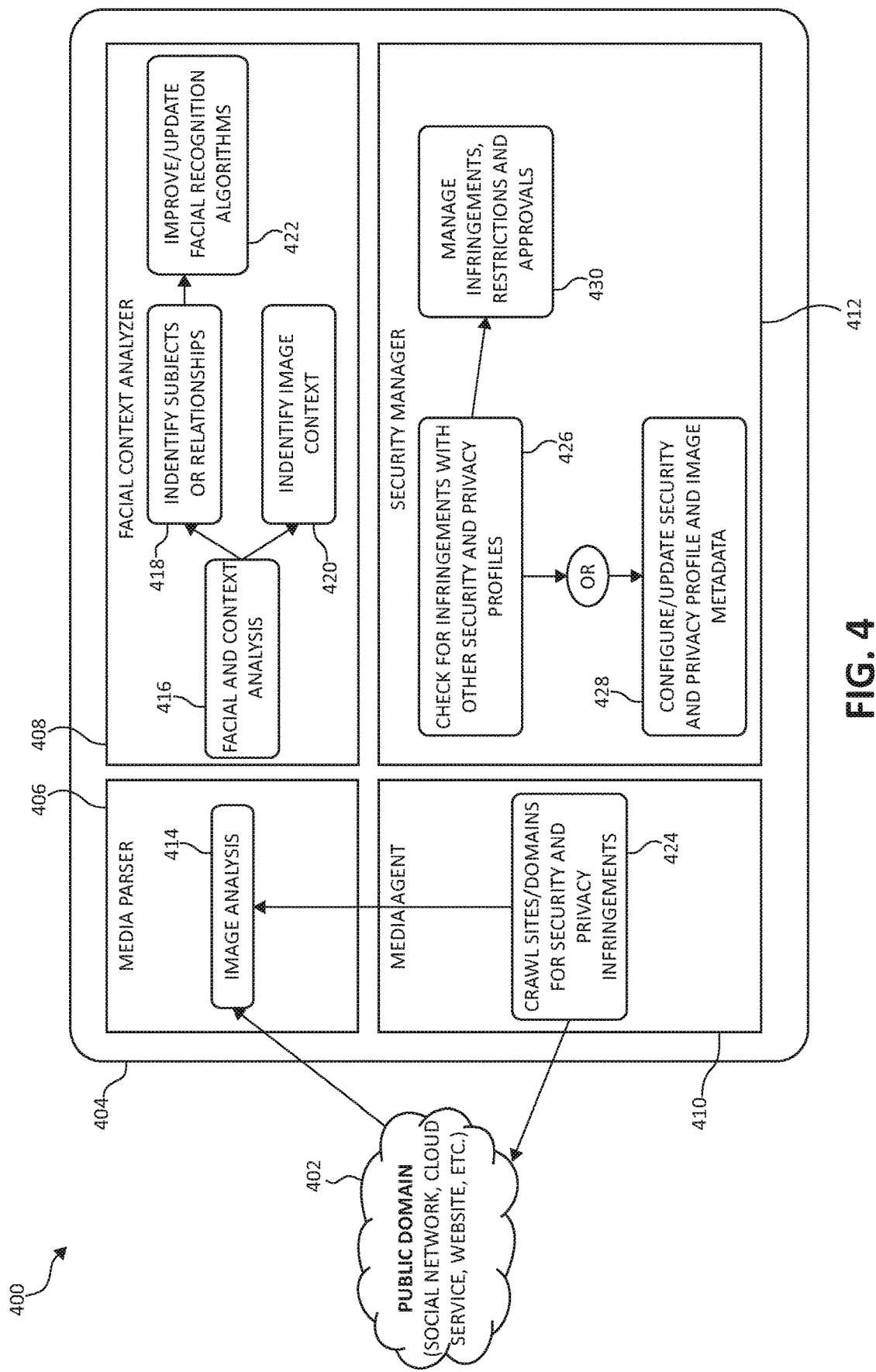
FIG. 4 is an additional block diagram depicting exemplary functional blocks that are operational when various aspects of the present invention are utilized as a service.

Consider, as an illustration of exemplary functional blocks to accomplish various purposes of the present invention, FIG. 4, following. FIG. 4 illustrates these exemplary functional blocks 400 and their relationship to various entities in the public domain 402 (such as social media networks, other private and public networks, cloud services, websites, storage locations, and other sites). Each of the functional blocks 400 may be implemented in hardware and/or software, such as by the computer/server 12 (FIG. 1), and/or the workloads layer 90 (FIG. 3).

In the depicted embodiment, a media parser 406 component is responsible for analyzing images being uploaded for content, metadata, publisher, owner, and other information. The media parser 406 interacts with the facial context analyzer 408 component, and specifically with the facial and context analysis 416 component for context and/or facial related elements of the image, which is then passed to the security manager 412 component for analysis, and then, execution of operations that are determined to be necessitated based on the analyzed context.

One of ordinary skill in the art will appreciate that while a "facial context analyzer 408" is depicted in the illustrated embodiment, the mechanisms of the present invention also contemplate other features of images, such as acoustical information of music (e.g., matching or similar audio spectrum), or visual information (matching or similar visual cues) in addition to facial context. In this way, the mechanisms of the present invention contemplate a broad variety of context analysis for images as contemplated in a broad sense.

In the depicted embodiment, the facial context analyzer 408 component is utilized by the media parser 406 component to identify context such as faces in images, so that the identified context may be correlated with security profiles through the security manager 412 component. In addition, the facial context analyzer 408 is used to continuously update and improve facial recognition techniques on subjects through new media being uploaded to the service by content owners. Content owners may also identify other relationships in their images to apply further restrictions through the security manager 412 (e.g., obtain approval to publish content of their children). This functionality is seen as exemplary blocks 418, 420, and 422, which depict the identification of subjects or relationships 418, the identification of image context 420, and the improvement and/or updating of facial or other context recognition algorithms 422.

The security manager 412, in turn, receives and sends communication to the facial context analyzer 408 as shown. The security manager 412 component may be responsible for identifying and enforcing security and privacy profiles that have been configured by content owners in relation to their content/metadata (represented by functional block 426). Content owners can configure restrictions for their content which may be hosted in a cloud service/social network such as authorizing only specific friends from downloading images, re-sharing sensitive images, or obtaining approval to publish a specific set of images to a specific site or social network. The security manager 412 may configure/update security and privacy profiles and image metadata based on the usage restrictions set by the owner (represented by functional block 428)

The security manager 412 is also responsible for managing the metadata for images based on the security privacy rules governing the images (represented by functional block 430). In addition, rules may also be configured for content that may be owned by someone else (which, for example, may be identified through the facial context analyzer 408) that may be directly linked to a specific user (e.g., images containing user's faces, images of the user's children, fraudulent images, etc.) so restrictive policies can also be applied to the additional content, or approval is obtained to publish the additional content.

The media agent 410 component, then operates, for example, among other searching functionality, to crawl through existing pages/domains (e.g. a cloud service/social network or specific sites to identify images) using the media parser 406 and/or facial context analyzer 408 components for infringement of security & privacy profiles (e.g., the user's image or face may have been used on a social network profile to create a fraudulent identity). If images are located, the location may be then reported for further action.

Figure 5:
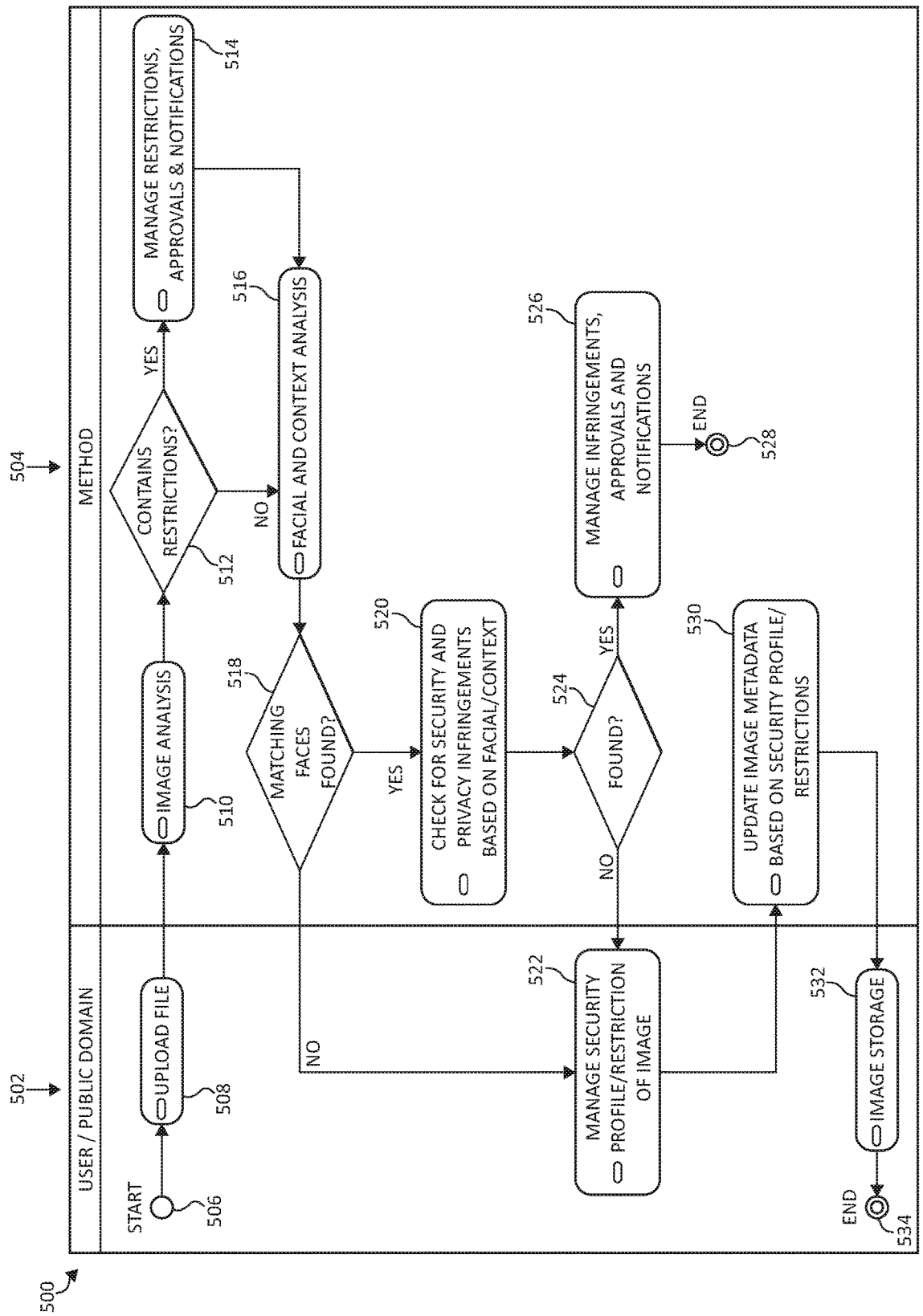
FIG. 5 is a flowchart diagram depicting various aspects of the present invention, including functional steps that may occur when a user uploads an image.

Turning now to FIG. 5, method 500 depicts, as a flowchart diagram, exemplary functionality for enhancing security and privacy of an image, in accordance with one embodiment of the present invention. Method 500 is separated into actions/operations that occur in the user and/or public domain (represented by section 502), and the method 500 itself (section 504).

Method 500 begins (step 506), the user uploading a file (step 508). In its broadest sense, the file may contain any fixed form of expression in digital form. In a subsequent step 510, the image undergoes preliminary analysis as previously described. If the image is found to contain usage restriction(s) (decision step 512), the usage restriction(s), approval(s) and notification(s) are then managed accordingly (step 514). Returning to step 512, if the image is not found to contain accompanying usage restrictions (by, for example, analysis of accompanying metadata), the method 500 undergoes facial and context analysis of the image (step 516).

If matching facial cues are located in decision step 518, the method 500 moves to step 520, which checks for security and privacy infringement based on particular facial or other determined content/context. If the particular content/context is found (decision step 524), the particular infringement, approval, and/or notification is managed (e.g., the user/owner is notified per the appropriate network path) in similar fashion to the previous management functionality described previously in step 514 (step 526). The method then ends (step 528).

Returning to decision step 524, if no infringement is found (or, alternatively returning to decision step 518 and no matching facial information is determined), the method 500 moves to step 522, which returns to the user/public domain for further management of the security profile/usage restriction(s) on the image at a subsequent time (for example, at a subsequent time, the owner may place a security profile or usage restriction on the particular image). When this occurs, the image metadata is then updated based on particular security profile settings, or usage restrictions put in place by the owner or other authorized representative for the owner (step 530). The image with updated metadata reflecting the security/privacy/notification information is then placed in storage (e.g., such as in a cloud-based image storage location) in step 532. The method 500 then ends (step 534).

Figure 6:
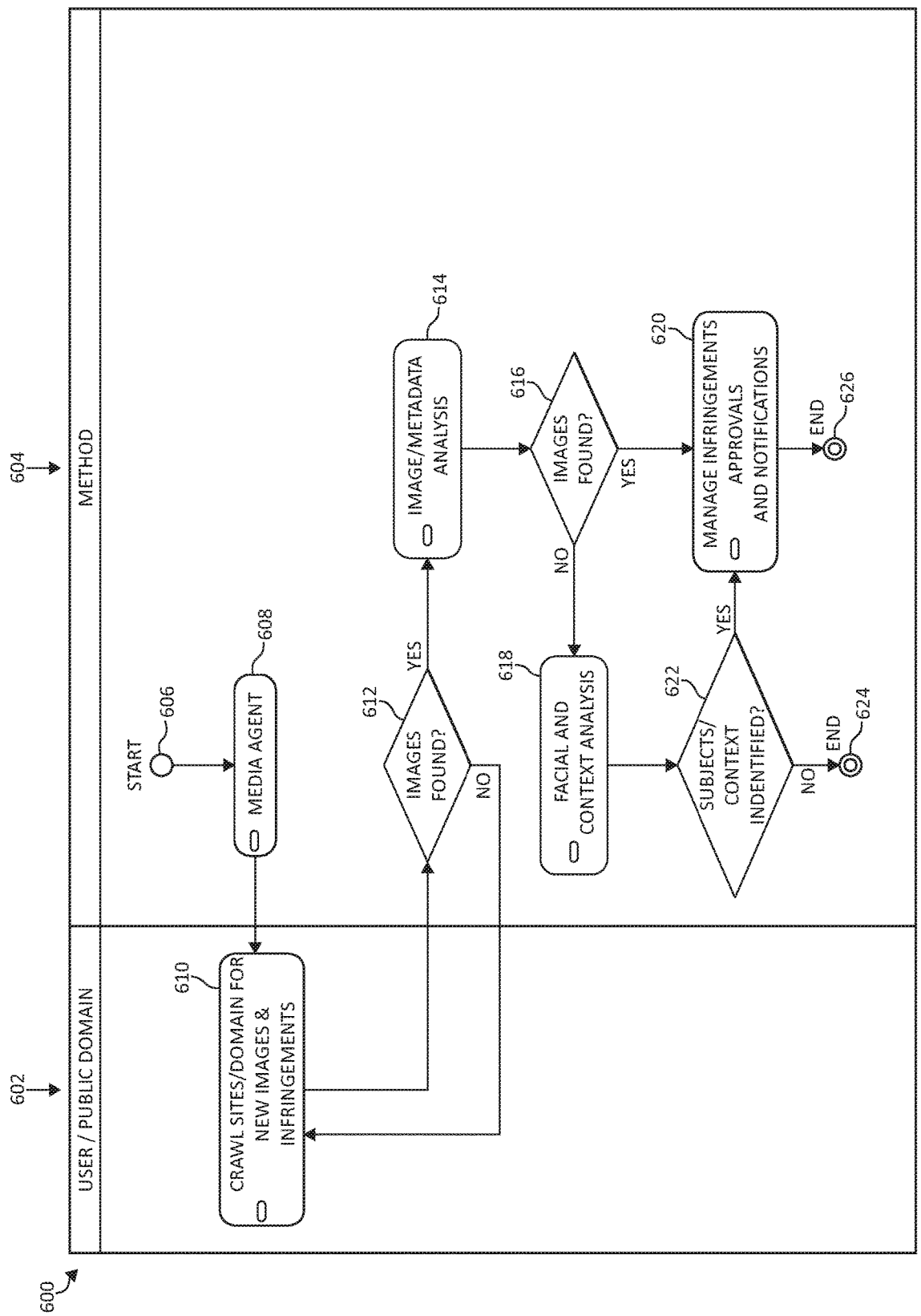
FIG. 6 is an additional flowchart diagram depicting various additional aspects of the present invention, including functional steps that may occur when various mechanisms of the illustrated embodiments search for new or existing images in the public domain that possibly infringe security profiles.

Turning now to FIG. 6, an additional flowchart diagram illustrating additional exemplary functionality for enhancing image security/privacy according to the present invention is shown as method 600 in the depicted embodiment. Here again as in FIG. 5, FIG. 6 is sectioned into operations occurring in the public domain 602, and the method 600 itself (represented by section 604).

Method 600 begins in step 606, where the media agent in block 608 functions to crawl sites/domains/other locations (or function in a similar way) for new images/newly discovered infringement (step 610). If a new image is discovered in decision step 612, the image undergoes further image/metadata analysis in step 614, following. If infringement is then found in decision step 616, the particular infringement, approval, and/or notification information is managed in step 620, and the method 600 then ends (step 626).

Returning to decision step 616, if infringement is not found, the image undergoes further facial and context analysis (step 618). If predetermined subjects and/or context associated with the image is then identified in decision step 622, the method 600 then returns to step 620 as previously, and the method 600 then ends (again, step 626). Returning to decision step 622, if predetermined subjects and/or context is not identified, the method 600 then ends in step 624.

Figure 7:
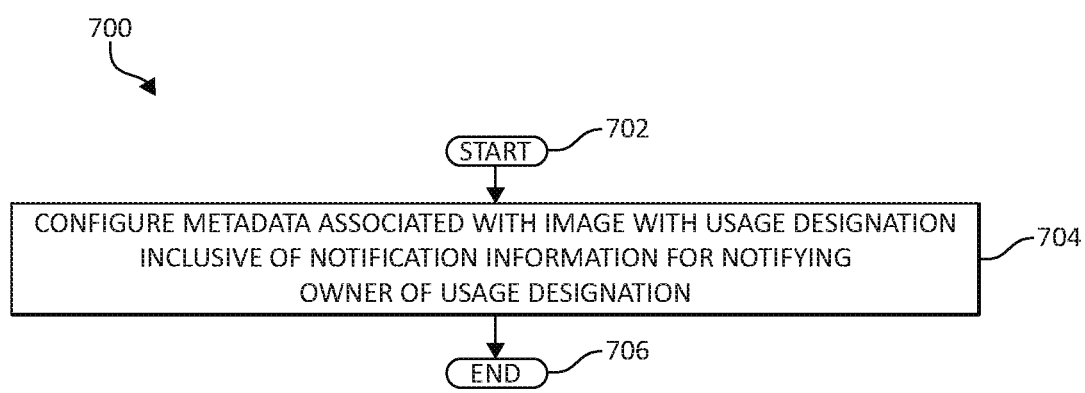
FIG. 7 is an additional flowchart diagram depicting an exemplary method for enhancing privacy and security, in which various aspects of the present invention may be implemented.

FIG. 7, following, is an additional flow chart depicting an exemplary method 700 for enhancement of privacy/security of images according to one embodiment of the present invention. Method 700 begins (step 702), with metadata associated with the image configured with a usage designation having accompanying notification information for notifying an owner of the usage designation if a condition of the usage designation is met (step 704). The method 700 then ends (step 706).

It may be noted, that exemplary methodologies described herein relating to analyzing restrictions may be extrapolated to anyone, who in various embodiments, may be allowed to set usage restrictions on various images. In other words, in some embodiments, the mechanisms of the present invention may trigger notification to the image owner regardless of who set the usage restriction (e.g., the eligibility of the individual to set the usage restriction does not come into account). As previously mentioned, anyone may set a particular usage restriction on a particular image, and the notification provided according to the restriction may go to the person setting the usage restriction, and not necessarily the original "owners" of the image. For example, a parent may place a restriction on his/her child's photo, or a user may place a restriction on a friend's photo. In these embodiments, the placing of those usage restrictions are not necessarily prevented (e.g., an unauthorized posting/publication of restricted images is not prevented), however, the notification of the image owner proceeds.

In alternative embodiments, a site, social network operator, or network administrator may place restrictions on the uploading of a particular image. However, embodiments of the present invention herein are contemplated that analyze images for usage restrictions set by any person. This scenario may be analogous to an example where anyone can set a lock or sensor/detector on a door, and whenever the door is open, the person who installed the lock, or sensor/detector receives an alert. Validation of the authority of an individual to set usage restrictions may be put in place in some embodiments, but is not necessarily required for the mechanisms of the present invention to operate as contemplated.

Consider the following example. Even if one doesn't own a particular image, a user may still upload the file with accompanying usage restrictions, and the mechanisms of the present invention will notify the owner if the image is uploaded to a particular location for infringement of their usage restrictions placed on the image. A particular owner may upload a photograph to a particular site with accompanying restrictions (i.e., nature photo that a photographer took in a national park). Regardless of what happens with the photo subsequently, the owner is then notified of violations of the usage restrictions, and even may be notified if the work is made into a derivative work by doctoring the image, or an attempt (unsuccessful or successful) is made to remove the security/privacy metadata. This would enable the owner to approach and report the issue to web sites where the infringement occurred, for example, and alert the web site and/or take other appropriate actions as necessary to protect their privacy/security and/or intellectual property.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. A method for enhancing privacy and security of an image by a processor, comprising:
   configuring metadata appended to the image uploaded to a first site with a usage designation at a first time, the usage designation having accompanying notification information;
   wherein the usage designation includes user-specified image usage restrictions associated with specific individuals appearing within the image;
   auto-crawling a plurality of sites, including the first site, to search for matching images to the image using a media agent; wherein, when a matching image to the image is identified in one of the plurality of sites, the matching image is analyzed to determine whether the matching image contains the appended metadata having the usage designation associated with the image; and
   responsive to determining the matching image contains the appended metadata, notifying an owner of the image with the notification information, at a second time subsequent to the first time, when a condition of the usage designation is met; wherein notifying the owner includes providing identifying information of an infringing party to the owner of the image when the condition of the usage designation is met.

2. The method of claim 1, wherein configuring the usage designation further includes specifying a usage restriction of the image by the owner.

3. The method of claim 2, wherein configuring the usage designation further includes configuring the usage designation to refer to a specified portion of the image.

4. The method of claim 1, further including initializing an upload mechanism for the image configured to:
   read the usage designation and notify the owner, or search for at least a portion of the image in additional images to find a related image.

5. The method of claim 2, wherein configuring the usage designation with the usage restriction further includes designating the image with a "do not download" or a "do not republish" usage restriction.

6. The method of claim 1, further including:
   managing, as a service, the metadata associated with the image and additional metadata associated with additional images uploaded into a data repository,
   parsing through the image and additional images via a media parser to identify the image or the additional images,
   analyzing facial context of the image or the additional images using a facial context analyzer, or
   identifying and enforcing security and privacy profiles configured by the owner for the image using a security manager.

7. A system for enhancing privacy and security of an image, comprising:
   a processor, operational within and between a distributed computing environment, that configures metadata appended to the image uploaded to a first site with a usage designation at a first time, the usage designation having accompanying notification information;
   wherein the usage designation includes user-specified image usage restrictions associated with specific individuals appearing within the image;
   auto-crawls a plurality of sites, including the first site, to search for matching images to the image using a media agent; wherein, when a matching image to the image is identified in one of the plurality of sites, the matching image is analyzed to determine whether the matching image contains the appended metadata having the usage designation associated with the image; and
   responsive to determining the matching image contains the appended metadata, notifies an owner of the image with the notification information, at a second time subsequent to the first time, when a condition of the usage designation is met; wherein notifying the owner includes providing identifying information of an infringing party to the owner of the image when the condition of the usage designation is met.

8. The system of claim 7, wherein the processor, pursuant to configuring the usage designation, specifies a usage restriction of the image by the owner.

9. The system of claim 8, wherein the processor, pursuant to configuring the usage designation, configures the usage designation to refer to a specified portion of the image.

10. The system of claim 8, wherein the processor, pursuant to configuring the usage designation with the usage restriction, designates the image with a "do not download" or a "do not republish" usage restriction.

11. The system of claim 7, wherein the processor initializes an upload mechanism for the image configured to:
- read the usage designation and notify the owner, or
- search for at least a portion of the image in additional images to find a related image.

12. The system of claim 7, wherein the processor:
- manages, as a service, the metadata associated with the image and additional metadata associated with additional images uploaded into a data repository,
- parses through the image and additional images via a media parser to identify the image or the additional images,
- analyzes facial context of the image or the additional images using a facial context analyzer, or
- identifies and enforces security and privacy profiles configured by the owner for the image using a security manager.

13. A computer program product for, by a processor, enhancing privacy and security of an image, the computer program product comprising a non-transitory computer-readable storage medium having computer-readable program code portions stored therein, the computer-readable program code portions comprising:
- an executable portion that configures metadata appended to the image uploaded to a first site with a usage designation at a first time, the usage designation having accompanying notification information; wherein the usage designation includes user-specified image usage restrictions associated with specific individuals appearing within the image;
- an executable portion that auto-crawls a plurality of sites, including the first site, to search for matching images to the image using a media agent; wherein, when a matching image to the image is identified in one of the plurality of sites, the matching image is analyzed to determine whether the matching image contains the appended metadata having the usage designation associated with the image; and
- an executable portion that, responsive to determining the matching image contains the appended metadata, notifies an owner of the image with the notification information, at a second time subsequent to the first time, when a condition of the usage designation is met; wherein notifying the owner includes providing identifying information of an infringing party to the owner of the image when the condition of the usage designation is met.

14. The computer program product of claim 13, further including an executable portion that, pursuant to configuring the usage designation, specifies a usage restriction of the image by the owner.

15. The computer program product of claim 14, further including an executable portion that, pursuant to configuring the usage designation, configures the usage designation to refer to a specified portion of the image.

16. The computer program product of claim 14, further including an executable portion that, pursuant to configuring the usage designation with the usage restriction, designates the image with a "do not download" or a "do not republish" usage restriction.

17. The computer program product of claim 13, further including an executable portion that initializes an upload mechanism for the image configured to:
- read the usage designation and notify the owner, or
- search for at least a portion of the image in additional images to find a related image.

18. The computer program product of claim 13, further including an executable portion that:
- manages, as a service, the metadata associated with the image and additional metadata associated with additional images uploaded into a data repository,
- parses through the image and additional images via a media parser to identify the image or the additional images,
- analyzes facial context of the image or the additional images using a facial context analyzer, or
- identifies and enforces security and privacy profiles configured by the owner for the image using a security manager.

* * * * *